Patented July 13, 1943

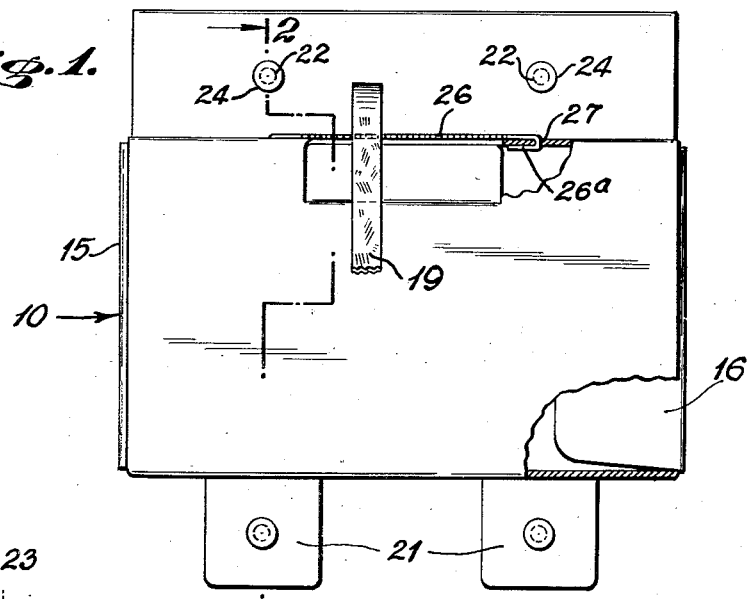

2,324,028

UNITED STATES PATENT OFFICE 2,324,028

STRIP DISPENSING CARTON

Harry J. Rossi, Bronx, N. Y., assignor to Fibre Cord Company, division of Kary-Safe Co., Inc., New York, N. Y., a corporation of New York Application December 14, 1939, Serial No. 309,178

8 Claims. (Cl. 206—58)

This invention relates to containers adapted for the packing, shipping and dispensing of strip or strand material, and particularly for the storing and dispensing of such material arranged on a spool or roll; and the object of the invention is to provide a container of the class described fashioned from sheet material in a manner to form at one portion thereof a discharge opening through which a strip may be drawn; a further object being to provide a strip severing or cutting means arranged in spaced relation to said opening whereby severing of the strip on said means will leave an end portion of the strip protruding from the container; another object being to provide as an integral part of said sheet material a drag or tension flap adjacent said opening to retain the strip against accidental movement; a further object being to provide a cutting means comprising a sharp-edged metal element secured to one edge portion of the container to form a part thereof; a still further object being to provide a container having integral mounting portions normally arranged within the boundaries of the container, and adapted to be foldably extended into operative position; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my invention are designated by suitable reference characters in each of the views; and in which:

Fig. 1 is a front elevation of one form of my invention having cut away portions to clearly indicate the structural association of the parts thereof.

Fig. 2 is a sectional view substantially on the broken line 2—2 of Fig. 1.

Fig. 3 is a perspective view of one form of cutting element which I employ.

Fig. 4 is a plan view of the blank employed in forming the container structure as seen in Figs. 1 and 2; and, Fig. 5 is a partial sectional view similar to Fig. 2, indicating a modification.

In the packing, shipping and dispensing of strip or strand materials, such as cords, tapes, or ribbons, arranged in a long length wound on suitable spools or rolls, great inconvenience is caused in the handling and dispensing of material due to the undesired tangling and unraveling of such material. It is the primary purpose of my invention to overcome these difficulties by providing a simple and compact device operating as a combination container and dispensing device for the materials in question.

For purposes of illustrating my invention, I have shown in Figs. 1 and 2 of the drawing a container 10 comprising a box part having top and bottom walls 11, 12, front and rear walls 13, 14, and end walls, 15, 16. These walls define a chamber 17 adapted to receive a roll or spool 18 of a suitable strip or strand material. For purposes of illustration, a representative strip or strand has been indicated in the drawing by the ribbon 19.

The rear wall 14 of the container is provided with suspending means as indicated by the upwardly extending portion 20 and the downwardly extending portions 21, which are apertured as at 22 to provide for the mounting of the container upon a wall or support 23 by suitable attaching devices 24.

It will, of course, be apparent that the container need not be mounted on the support in the particular manner indicated, but may be oriented to dispose the discharge opening at the side or bottom of the container. In some uses, on the other hand, it may be more desirable to use the container detached from any support, in which event it will be noted that the members 21 may be folded again into alinement with the wall 12 to provide for the resting of the container in the upright position indicated, upon a table, shelf, or other surface.

The upwardly extending suspending portion 20 is preferably reinforced by originally forming said portion longer than desired and folding back the end portion 20a thereof, as indicated at 20b, to form a double thickness of sheet material. This construction will be important when the container is fashioned from lightweight material such as cardboard. It will be apparent, however, that if the container were formed from stronger material, such as sheet metal, this reinforcing feature would be unnecessary.

The top wall 11 of the container is preferably provided at the rear edge thereof with a flap 25 extending into the chamber 17 of the container and adapted to bear against the inner surface of the rear wall 14. The strip 19 passes between the edge of the flap 25 and the rear wall 14; and it will be apparent that the engagement of the strip 19 between these members serves to retard movement of the strip therebetween to prevent both undesired outward feed or delivery of the strip and to prevent the protruding end of the strip from sliding back into the chamber 17.

The top wall 11 is further provided centrally of the front edge thereof with a cutting element 26 having end portions 26a passing through apertures 27 formed in the top wall 11, said ends being folded upon the inner surface of the wall in retaining the element thereon. The cutting element 26 is preferably formed of thin sheet metal having a straight rear edge 28. The front edge 29 is provided centrally and throughout the greater portion of the length thereof with sharp irregularities adapted to form the actual cutting edge of the element. The element 26 is arranged as indicated in Fig. 2 so that the cutting edge 29 will be exposed centrally of the front edge portion of the top wall 11. To insure proper exposure of the cutting edge 29, the front wall 13 of the container is provided centrally of the upper edge thereof and in alinement with the cutting edge 29 with an inwardly flexed tab 30. It will be apparent in this connection that the tab 30 preferably includes a narrow portion of the material of the top wall thereby forming a recessed portion along the front edge of the top wall. This recessed portion provides for the proper exposure of the cutting edge 29 while still disposed within the adjoining boundaries of the container. It will also be apparent that the tab 30 is adapted to form a reinforcing means for the cutting element or plate 26.

The container 10 is preferably formed from a single blank 31 of sheet material, cut and folded to form the various walls and flaps of the container. The walls 11, 12, 13, 14, 15, and 16, previously mentioned have been similarly identified on the blank 31. Likewise the suspending portions 20 and 21, as well as the flaps 25 and 30, have been indicated. In the blank 31, additional flaps 32 and 33 are provided on the side edges of the top and bottom wall parts respectively; and the free edges of the end walls 15 and 16 are provided with flaps 34 and 35 respectively. The flaps 32 and 33 co-operate with the end walls 15 and 16 to close the ends of the container and to reinforce the same; while the flaps 34 and 35 provide means in conjunction with the flaps 32, 33, for retaining the blank in the assembled position to form the container. It will, of course, be apparent that the dimensions of the blank 31 may be altered in any desired manner to provide for the formation of containers of different contours and also for dispensing various types and kinds of strip and strand material.

To facilitate packing and shipping of the container, the suspending portion 20 is preferably folded upon the surface of the wall 11 and the members 21 arranged in alinement with the wall 12 to form a container of substantially uniform rectangular dimensions. It will, of course, be apparent that when two or more of the containers are packed together for shipment, the folding may be dispensed with; and the containers interfitted one with another to dispose the projecting portion 20 of one container along outer surfaces of another container.

In Fig. 5 of the drawing there is shown a slight modification of the structure of the suspending portion 20 wherein a single fold 20c is provided between the member 20 and the wall 14, as indicated in dotted lines in Fig. 4. The member 20 can then be considered as constituting a front portion 20a and a rear portion 20d; and it will be apparent that when the portions 20a and 20d are arranged in the extended position shown in Fig. 5, these alined portions will be disposed to substantially cover the top wall 11 and the cutting element 26 of the device together with a protruding portion 19a of the strip or strand material. Suitable means may be provided for retaining the portions 20a and 20d in this position during shipment and storage, if this be desired. In assembling the portions 20a and 20d to form the suspending member 20, it will be apparent that the greater length provided in the portion 20a serves to maintain alinement between the portion 20d and the back wall 14 of the device. It will be noted in this connection that suitable adhesive means may be provided, as for example on the inner surface of the portion 20a, to form a permanently stiffened suspending member 20.

In the use of the device a desired length of strip 19 is withdrawn from the container, and the strip is then pulled downwardly against the cutting edge 29. The irregular contour of the cutting edge is adapted to readily rupture the strip 19 in a number of places; and continued pressure on the strip causes the strip to be severed along a broken line defined by the cutting edge. The actual operation of severing the strip may be relatively slow and constitute more or less of a tearing operation; or, on the other hand, the strip may be severed by a quick jerk on the withdrawn portion thereof. When the withdrawn length of strip 19 has been severed, a short length 19a remains exposed on the top of the container in position to be readily grasped in measuring for a further desired length, and the short end 19a is prevented from returning to the chamber 17 of the container in the manner previously described.

It will be apparent that ribbons or strips of varying widths may be supported and dispensed in my improved device. On the other hand, the strip or strand may constitute thread, string, cord or heavy twine; and the container may be modified to suit the particular uses.

My improved combination container and dispenser, while adapted for dispensing many types of tape and strand material is particularly adapted to be used in the shipping, storing and dispensing of "Cellophane" cords, tapes, and ribbons. In this connection it will be noted that it is of primary importance to provide protection for the strip or strand material and to prevent accidental or unintended movement of the material either into or out of the container. The particular arrangement or location of the discharge opening may be varied in adapting the device to particular uses, as may the particular arrangement and location of the cutting element. It is important, however, that the discharge opening and cutting element be in spaced relation to each other in a manner to provide a protruding portion of the strand which may be readily grasped in drawing a desired length of material from the container.

Having fully described my invention, what I claim as new and desire to secure by Letters Patent, is:

1. A dispensing device of the character described comprising a container formed from foldably related parts, one wall of said container being provided along one edge thereof with a discharge passage opening into the interior of said container, the container forming a support for a strand-like element, means centrally of another edge of said container for severing said element, means adjacent said discharge passage cooperating with said element to prevent accidental movement of an end portion of said element with respect to said container, said last named means comprising a foldable flap extending from one edge of one wall into the interior of said container and bearing against said strip and another wall of the container.

2. A strip dispensing device of the character described comprising a sheet of thin material cut and scored to form foldably related parts defining a substantially closed container and suspending means in conjunction with one wall of said container, another wall of said container being provided adjacent said first named wall thereof with an inwardly extending flap adapted to bear against the inner surface of said first named wall thereby forming a strip retarding discharge passage for the container, and means arranged centrally of another edge portion of the container forming a strip severing element on the container.

3. A strip dispensing device of the character described comprising a sheet of thin material cut and scored to form foldably related parts defining a substantially closed container and suspending means in conjunction with one wall of said container, another wall of said container being provided adjacent said first named wall thereof with an inwardly extending flap adapted to bear against the inner surface of said first named wall thereby forming a strip retarding discharge passage for the container, means arranged centrally of another edge portion of the container forming a strip severing element on the container, said last named means comprising a thin metal plate secured to one wall of said container, one edge of said plate extending along said last named edge of the container, and a portion of said edge of the plate being provided with cutting irregularities.

4. A strip dispensing device of the character described comprising a sheet of thin material cut and scored to form foldably related parts defining a substantially closed container and suspending means in conjunction with one wall of said container, another wall of said container being provided adjacent said first named wall thereof with an inwardly extending flap adapted to bear against the inner surface of said first named wall thereby forming a strip retarding discharge passage for the container, means arranged centrally of another edge portion of the container forming a strip severing element on the container, said last named means comprising a thin metal plate secured to one wall of said container, one edge of said plate extending along said last named edge of the container, a portion of said edge of the plate being provided with cutting irregularities, and the adjacent wall of said container having a cut out portion in alinement with the cutting irregularities of said plate, said cut out portion being flexed inwardly thereby providing for the protruding relationship of said cutting irregularities and forming a reinforcing member for said tape severing element and the wall supporting the same.

5. A strip dispensing device of the character described comprising a sheet of thin material cut and scored to form foldably related parts defining a substantially closed container and suspending means in conjunction with one wall of said container, another wall of said container being provided adjacent said first named wall thereof with an inwardly extending flap adapted to bear against the inner surface of said first named wall thereby forming a strip retarding discharge passage for the container, means arranged centrally of another edge portion of the container forming a strip severing element on the container; said last named means comprising a thin metal plate secured to one wall of said container, one edge of said plate extending along said last named edge of the container, a portion of said edge of the plate being provided with cutting irregularities, and means comprising an inwardly flexed tab formed from portions of said last named wall and the wall of the container adjacent thereto for exposing said cutting irregularities while maintaining the same within adjoining boundaries of the container.

6. A strip dispensing device of the character described comprising a sheet of thin material cut and scored to form foldably related parts defining a substantially closed container and suspending means in conjunction with one wall of said container, another wall of said container being provided adjacent said first named wall thereof with an inwardly extending flap adapted to bear against the inner surface of said first named wall thereby forming a strip retarding discharge passage for the container, means arranged centrally of another edge portion of the container forming a strip severing element on the container, said suspending means comprising protruding portions extending from opposed edges of said first named wall of the container, at least one of said protruding portions being formed from the material of an adjacent wall of the container, the other of said protruding portions being foldable onto another adjacent wall of the container in forming a shipping container of generally rectangular contour, and said last named foldable portion extending to and overlying said strip severing element forming a guard therefore when in the collapsible position for shipping.

7. A strip dispensing device of the character described comprising a sheet of thin material cut and scored to form foldably related parts defining a substantially closed container and suspending means in conjunction with one wall of said container, another wall of said container being provided adjacent said first named wall thereof with an inwardly extending flap adapted to bear against the inner surface of said first named wall thereby forming a strip retarding discharge passage for the container, means arranged centrally of another edge portion of the container forming a strip severing element on the container, said suspending means comprising protruding portions extending from opposed edges of said first named wall of the container, at least one of said protruding portions being formed from the material of an adjacent wall of the container, the other of said protruding portions comprising foldably related parts adapted to be arranged in a collapsed extended position overlying another adjacent wall of the container, the strip severing element and discharge passage being arranged at opposed ends of said last named adjacent wall, and said parts in the extended position forming means covering and concealing the severing element and a length of strip protruding from said discharge passage.

8. A dispensing device for strand-like material of the character described, said device comprising a blank cut and scored to provide foldably related parts adapted, when assembled, to form an oblong rectangular container for the material to be dispensed, one long edge portion of the container having a discharge opening extending throughout the full length of said edge through which the strand-like material may be withdrawn from the container, another edge of the container having intermediate the ends thereof a cutting element arranged within boundary edges of the container, the container being recessed adjacent the cutting element to expose the cutting edge thereof for engagement with the strand in severing the strand at a point substantially equal to the width of a wall of the container to maintain the strand protruding from the discharge opening of the container.

HARRY J. ROSSI.